July 31, 1934.    A. W. HUNZ    1,968,148
VEHICLE BODY TILTING MECHANISM
Filed June 25, 1931    5 Sheets-Sheet 1

INVENTOR
ALPHONSE W. HUNZ
By Paul, Paul & Moore
ATTORNEYS

Patented July 31, 1934

1,968,148

UNITED STATES PATENT OFFICE 1,968,148

VEHICLE BODY TILTING MECHANISM

Alphonse W. Hunz, East Chicago, Ind.

Application June 25, 1931, Serial No. 546,793

24 Claims. (Cl. 298—14)

This invention relates to an improved body tilting mechanism particularly adapted for use in connection with the bodies of wagons, trucks, and sleighs, whereby such a body of comparatively longer proportions may be tilted to a low inclined position for conveniently drawing or pushing a load onto a body from the rear and also whereby said body may be tilted to a more elevated inclined position to cause its contents to be discharged therefrom by gravity.

An object of the invention is to provide in combination with a vehicle comprising spaced-apart supports having a load carrier mounted thereon, a mechanism for longitudinally moving the load carrier on said supports, first in one direction and then in the opposite direction, whereby the load carrier is tilted to an inclined position to cause the load supported thereon to be discharged therefrom by gravity.

A further object is to provide a vehicle comprising spaced-apart supports adapted to movably support a load carrier, and means being provided upon one of said supports whereby the carrier may be longitudinally moved upon said supports, and a strut being pivotally connected with the other of said supports and having a movable connection with the carrier, whereby the latter may be moved in one direction and tilted, and means being provided for securing the strut to the carrier, when the latter has been moved in one direction whereby, when the movement thereof is reversed, the strut will tilt the carrier to a more elevated inclined position.

A further object is to provide a wagon comprising a rear bolster and a front bolster, and a shaft being mounted adjacent to the rear bolster and provided with anti-friction rollers adapted to support a structural frame, said frame having a connection with said shaft whereby when the latter is rotated, the frame may be moved backwardly and forwardly over the rear bolster. A further object is to provide a load carrier, such as a wagon box, having its rear intermediate portion supported upon said frame and having its forward portion adapted to be supported upon the front bolster, and a strut having one end pivotally connected with the forward portion of the wagon adjacent to the front bolster and extending rearwardly under the load carrier, and a guide being mounted upon the forward portion of the carrier and having a slidable connection with the strut and provided with means for locking it to the strut, when the load carrier has been moved rearwardly, whereby the rearward swing of the carrier may be checked, and when the carrier is moved forwardly with respect to the bolsters, the strut will cause the forward end portion of the carrier to be elevated to an inclined position whereby the contents of the carrier may be discharged therefrom by gravity.

Other objects reside in the means provided for longitudinally translating the wagon box upon the bolsters; in the means provided for elevating the rear portion of the wagon box, when the latter is initially translated in a rearward direction; in the connection between the strut and the wagon box, whereby the box may be tilted to different angular positions; in the means provided for preventing rotation of the front bolster during the dumping operation; in the means provided whereby the strut may be pivotally connected with the wagon gear, either forwardly or rearwardly of the front bolster; and, in the general construction of the parts of the mechanism, which is very simple and inexpensive and may be readily applied to an ordinary wagon or truck in a comparatively short time.

Other objects of the invention will appear from the following description and accompanying drawings and will be pointed out in the annexed claims.

In the accompanying drawings, there has been disclosed a structure designed to carry out one of the various objects of the invention, but it is to be understood that the invention is not confined to the exact features shown as various changes may be made within the scope of the claims which follow.

Figure 1:
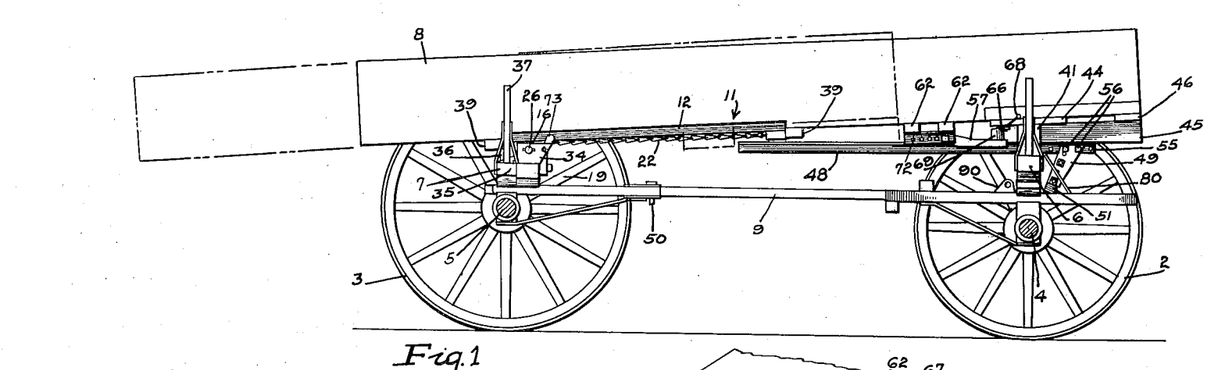
Figure 1 is a view showing a side elevation of a conventional type of wagon, partially in section, illustrating the invention embodied in the construction thereof, the dotted lines indicating the position of the load carrier or box when moved rearwardly.
Figures 2, 7:
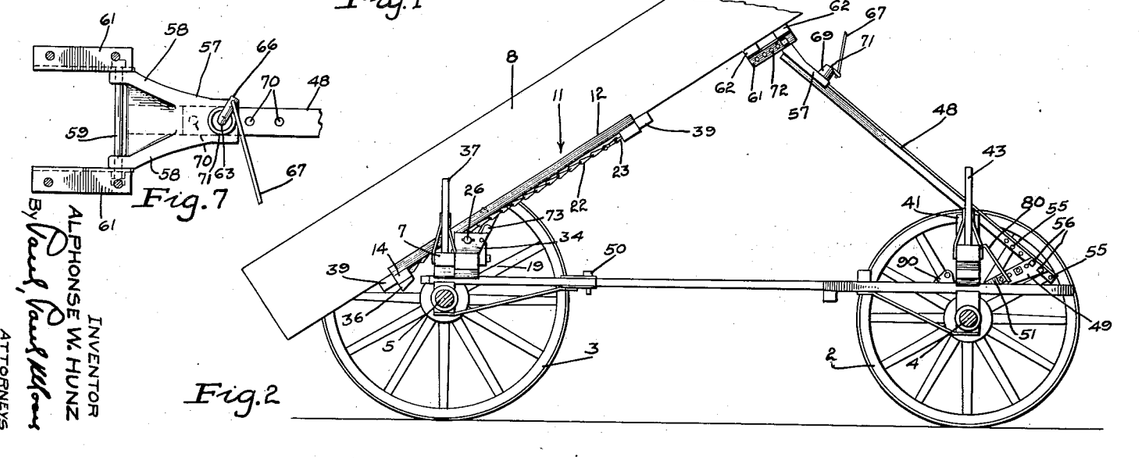
Figure 2 is a view similar to Figure 1, illustrating the position of the box when in load dumping position.
Figure 7 is an enlarged detail plan view on the line 7—7 of Figure 6.

In the selected embodiment of the invention here shown, for purposes of disclosure, there is illustrated in Figures 1 and 2, a conventional type of wagon comprising the usual front and rear wheels 2 and 3, respectively, axles 4 and 5, and the front and rear bolsters 6 and 7, respectively, upon which the load carrier or box 8 is mounted. The front and rear axle assemblies including the bolsters, are shown connected together with the usual reach rod 9.

Figure 3:
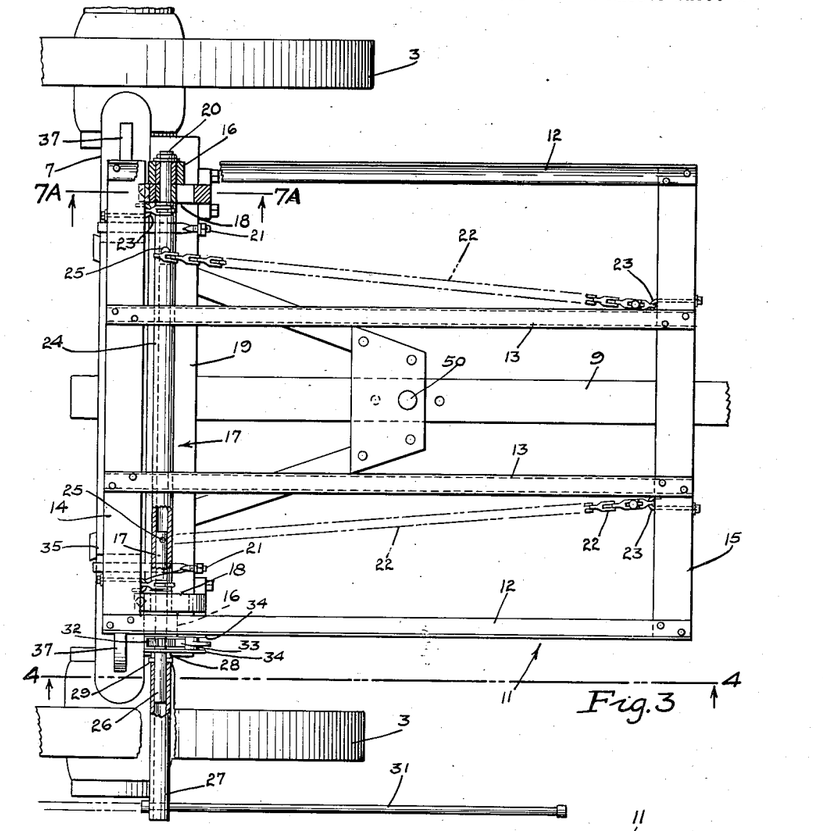
Figure 3 is an enlarged detail sectional plan view showing only the rear portion of the wagon with the load carrier removed therefrom, and showing the structural frame for supporting the rear portion of the load carrier upon the rear bolster.
Figure 4:
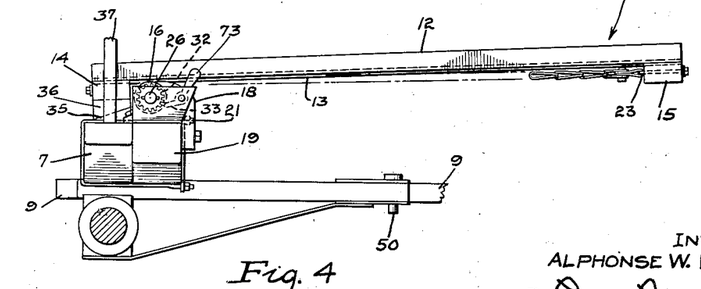
Figure 4 is a detail sectional view on the line 4—4 of Figure 3, showing the means provided for locking the load carrier in an inclined position.
Figures 6, 7A:
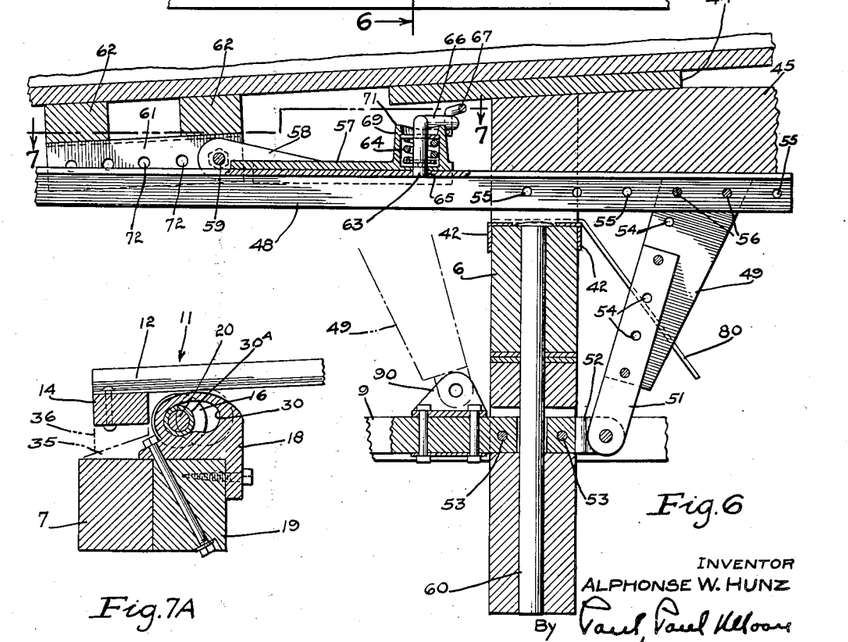
Figure 6 is an enlarged detail sectional view on the line 6—6 of Figure 5, showing the means for pivotally connecting the strut to the front bolster assembly.
Figure 7A is a detail sectional view on the line 7A—7A of Figure 3, showing the means for elevating the load carrier, upon initial rearward movement thereof.

The means provided for supporting the rear portion of the load carrier 8 upon the rear bolster 7, is best shown in Figures 3 and 4, and comprises a structural frame 11 composed of side rails 12—12, preferably of angle iron cross-section, and intermediate rails 13—13, all of which are suitably tied together as a unit by suitable cross members 14 and 15. The frame 11 is adapted to travel backwardly and forwardly upon suitable anti-friction rollers 16 mounted upon a cross shaft 17 supported in arcuately formed slots 30 of a pair of brackets 18 fixed to a cross piece 19 suitably secured to the rear bolster 7 by such means as U-bolts 21. The shaft 17 comprises a tubular member 24, such as a piece of pipe, to the ends of which may be fastened shaft extensions 20 and 26. If desired, the tubular member 24 may be omitted and a solid shaft used in lieu thereof. Rollers 30A support the shaft extensions 20 and 26 in the arcuately formed slots 30, to minimize friction, as shown in Figure 7A. The side rails 12—12 of the frame 11 engage the rollers 16—16, as shown in Figures 3 and 4.

The frame 11 is adapted for rearward and forward movement with respect to the rear bolster 7, and the means provided for thus translating the frame is here shown as consisting of suitable flexible elements such as chains 22, having their forward ends secured to the front cross piece 15 of the frame 11 by suitable hook bolts 23, and having their opposite ends similarly secured to the cross piece 14 at the rear of the frame 11 by similar hook bolts 23. The chains 22 are coiled about the tubular shaft 17, between the brackets 18—18, and are secured thereto by suitable pins or bolts 25 each passing through a link of its respective chain and through the tubular member 24, so that the intermediate portions of the chains are secured to the shaft.

The shaft extension 26 is adapted to receive one end of a sleeve 27 provided with oppositely disposed notches 28—28 at its inner end adapted to receive a pin 29 secured in the shaft extension 26. An operating rod 31 is provided at the opposite end of the sleeve 27 whereby the latter may be rotated to impart a rotary movement to the shaft 17, for the purpose of translating the frame 11 upon the wagon gear. When the shaft is rotated in a counter clockwise direction, when viewed as shown in Figures 3 and 4, the frame 11 will be moved in a rearward direction by reason of the chain sections connecting the shaft with the forward cross member 15 of the frame by being wound about the tubular member 24, while at the same time, the end portions of the chains connected with the rear cross member 14 are unwound from the shaft 17. Thus, it will be seen that by rotating the shaft 17, the frame 11 may be moved rearwardly or forwardly, as desired. If desired, a suitable operating crank may be provided in place of the sleeve 27 and operating rod 31 for rotating the shaft 17. A ratchet device is provided for locking the shaft in adjusted positions, and consists of a ratchet wheel 32 secured to the shaft extension 26 and adapted to be engaged by a pawl 33, here shown supported between a pair of plates 34 which are suitably connected together and are apertured to receive the shaft extension 26.

To limit the forward movement of the frame 11 and also to provide a support therefor, inclined blocks or abutments 35 are secured to the top face of the rear bolster 7 adapted to be engaged by correspondingly shaped blocks or abutments 36 secured to the bottom of the rear cross piece 14 of the frame 11, as best shown in Figure 4. The usual bolster stakes 37 provided upon the rear bolster 7 prevent lateral or sidewise movement of the frame 11. The load carrier 8, here shown in the form of a wagon box, has its rear intermediate portion supported upon the frame 11, as shown in Figures 1 and 2. Cross rails 39 are secured to the bottom of the load carrier to prevent relative longitudinal movement of the carrier upon the frame 11.

The arcuately formed slots 30 of the brackets 18 have an important duty to perform in that when the box 8 is to be moved rearwardly into load-dumping position, these slots cause the rear end portion of the box to be slightly elevated, when the shaft 17 is initially rotated, so as to move the stop blocks or members 35 and 36 out of frictional engagement with each other, and whereby the load will be supported directly upon the rollers 16—16 of the shaft 17. When the box 8 is in load-supporting position, the load will be carried directly upon the blocks 35 and 36, and not upon the rollers 16. If desired, the blocks 35 and 36 may be omitted, in which case the load may be supported upon the rollers 16—16 on the shaft 17. In some cases, it may also be found desirable to dispense with the slots 30 and use ordinary brackets in lieu of the slotted brackets 18.

Figure 5:
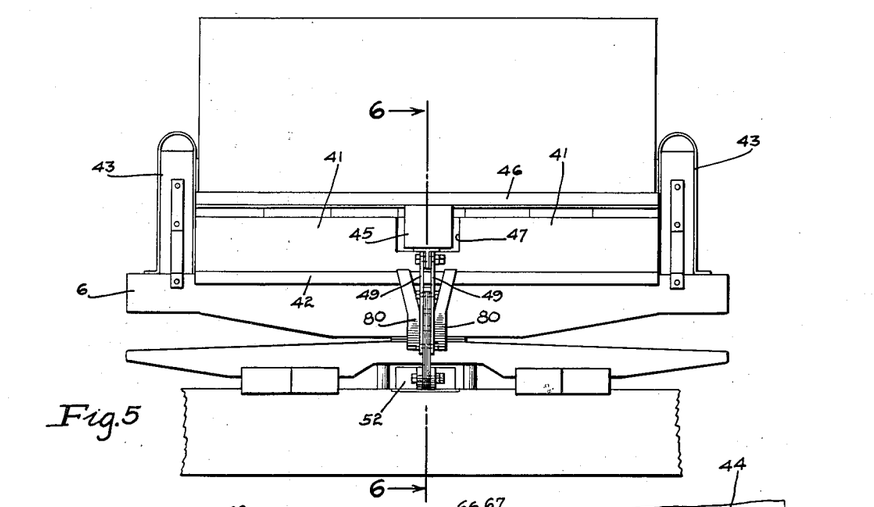
Figure 5 is a front elevation of the wagon with some of the parts broken away.

The forward portion of the box 8 is supported upon filler blocks 41 mounted upon the front bolster 6, and provided at their lower portions with longitudinally extending angle irons 42—42 adapted to be fitted over the upper portion of the bolster to thereby retain the filler blocks 41 in position thereon. The outer ends of the filler blocks may be abuttingly engaged with the usual bolster stakes 43—43. A suitable reinforcing plate 44 is shown secured to the bottom of the box 8 adapted to engage the filler blocks 41, as shown in Figures 1, 5, and 6, and a longitudinally extending member 45 is, in turn, secured to the reinforcing plate 44 and to a cleat 46 provided at the forward end of the box, as shown in Figure 1. The member 45 is preferably shaped as shown in Figures 1 and 5, and is movable through a gap 47 provided between the adjacent ends of the filler blocks 41, The means provided for tilting the box to an inclined position when the latter is moved forwardly, after having been moved rearwardly to the dotted line position shown in Figure 1 is best shown in Figures 1, 2, and 6, and comprises a strut 48, here shown as T-shaped in cross section and having one end adjustably secured between suitable plates 49 which, in turn, are adjustably secured to an arm 51 having its lower end pivotally connected to a bracket 52, shown secured to the forward end of the reach rod 9 by suitable bolts 53. The plates 49 and arm 51 are provided with a series of alined apertures 54 whereby the plates may be adjusted upon the arm 51 and, in like manner, the strut 48 is provided with a series of apertures 55 spaced equi-distant apart and adapted to receive the bolts 56 securing together the strut and plates 49. The apertures 55 in the strut provide means whereby the strut may be relatively adjusted with respect to the plates 49. The vertical web of the strut 48 passes between the adjacent ends of the filler blocks 41 so that the strut may extend rearwardly under the intermediate portion of the wagon box, as shown in Figure 1.

A suitable guide 57 is slidably mounted upon the strut 48 and is provided with rearwardly extending spaced apart arms 58 apertured to receive a bolt or rod 59 which also is received in suitable apertures provided in a pair of angle brackets 61, here shown secured to suitable cross sills 62 secured to the bottom of the wagon box, as best shown in Figures 1, 2, and 6. A locking bolt 63 is mounted in the slide 57 and has a spring 64 constantly urging it in a downward direction whereby the lower terminal thereof may lockingly engage one of a series of apertures 65 provided in the strut 48, as shown in Figure 6. The locking bolt 63 has an offset end portion 66 to which one end of an operating rod 67 may be connected, the opposite end portion 68 of which projects from beneath the wagon box, as shown in Figure 1, whereby it may be conveniently operated. The spring 64 is supported in a hollow boss 69 having its upper edge 71 shaped like a cam so that when the offset end portions 66 of the locking bolt is rotated in one direction, the locking bolt will be moved upwardly out of engagement with the socket 65 in the strut, whereby the guide may be relatively moved upon the strut. When the offset end portion 66 of the locking bolt is swung to the position shown in Figure 6, the locking bolt will be in position to engage one of the apertures 65 provided in the strut when the guide is longitudinally moved thereon. A plurality of apertures 72 are provided in the angle brackets 61 to permit adjustment of the guide 57 upon the bottom of the wagon box, as will readily be understood by reference to Figures 1, 2, and 6.

When the parts are in their normal inoperative positions, as shown in Figure 1, and it is desired to operate the mechanism to cause the box to dump or discharge its load, the operator will rotate the shaft 17 by means of the sleeve 27 and rod 31, in a counter clock-wise direction, whereupon the shaft will move forwardly in the arcuately formed slots 30 and thereby elevate the frame 11 to cause the inclined block 36 to move out of engagement with the fixed block 35. Continued rotation of the shaft will thereafter cause the frame 11 to be translated in a rearward direction, carrying the wagon box 8 with it, as indicated by the dotted lines in Figure 1. When the box reaches the dotted line position shown in Figure 1, the locking bolt 63 will engage one of the sockets or apertures 70 provided in the rear end portion of the strut 48, which will interrupt further rearward movement of the box. The operator will then reverse the direction of rotation of the shaft 17, whereupon the frame 11 will be translated in a forward direction, thereby causing the box 8 to be moved forwardly therewith. Because of the strut being securely locked to the guide 57, by reason of the locking bolt 63 being received in one of the apertures 70, as shown in Figure 6, the strut will cause the forward end of the box 8 to be elevated to the position shown in Figure 2, whereby the contents thereof may be discharged from the box by gravity.

To lower the box to its normal position, as shown in full lines in Figure 1, the operator may rotate the locking bolts 63 whereby the upper cam edge 71 of the boss 69 will cause the bolt to move out of engagement with the socket 70, thereby permitting the forward end of the box to drop by gravity into the front bolster, or the operator may manipulate the shaft 17 to cause the box to be moved rearwardly to the dotted line position shown in Figure 1, whereupon the box may be slowly lowered to its horizontal position shown in dotted lines in Figure 1. The locking bolt may then be disengaged from the aperture 70 and the shaft manipulated to move the box forwardly to the full line position shown in Figure 1. It will thus be seen that by rotating the shaft 17 and manipulating the locking bolt 63, the load carrier or box 8 may readily be tilted to an inclined load dumping position and subsequently be returned to its normal position, shown in full lines in Figure 1. When the box is being tilted to an inclined position, the pawl 33 will engage the ratchet 32 and prevent the box from accidentally returning to its normal position. To lower the box, the pawl 33 is moved out of engagement with the ratchet 32 by manipulation of the handle 73 provided upon the ratchet.

Means are provided for preventing the front bolster from relatively rotating about the axis of the king bolt 60, when the box 8 is lifted out of engagement with the bolster as shown in Figure 2. Such means may consist of a pair of forwardly extending guide members 80 having their upper ends suitably secured to the bolster and having their lower ends spaced apart to receive the plates 49 securing the forward end of the strut 48 to the arm 51. By thus arranging these guide members, the bolster will be prevented from relatively rotating when the box is elevated, so that when the box is lowered to its normal load supporting position, it will be received between the bolster stakes 43 of the bolster in the manner shown in Figure 5.

Means are provided whereby a relatively longer load carrier such, for example, as a hay rack, not shown, may be supported upon the wagon gear. When a longer load carrier is to be used, it may be necessary to elongate the wagon gear, which is accomplished in the usual manner by means of the usual adjustable connection provided between the rear axle assembly and the reach rod, the reach rod usually having a plurality of spaced apertures adapted to receive the coupling bolt or pin 50 as shown in Figures 1, 2, and 3. When the wagon gear is thus elongated, it may be necessary to support the forward end of the strut at the rear of the front bolster, and a bracket 90 is therefore secured to the forward end portion of the reach rod 9, directly back of the front bolster, as best shown in Figure 6. To this bracket, the arm 51 of the strut is connected, as indicated by the dotted lines in Figure 6. The plates 49 connecting the arm 51 with the strut are preferably secured to the strut position indicated. The operation of the mechanism will be substantially the same as that shown and described with reference to Figures 1 and 2.

The supporting brackets 52 and 90 for the arm 51 of the strut are mounted in such a manner as not to swing with the front axle, in order that the strut will always be retained in alinement with the load carrier or box 8. It has therefore been found more practical to secure the brackets 52 and 90 to the forward end portion of the reach rod whereby they cannot swing with the front axle.

Figures 8, 11:
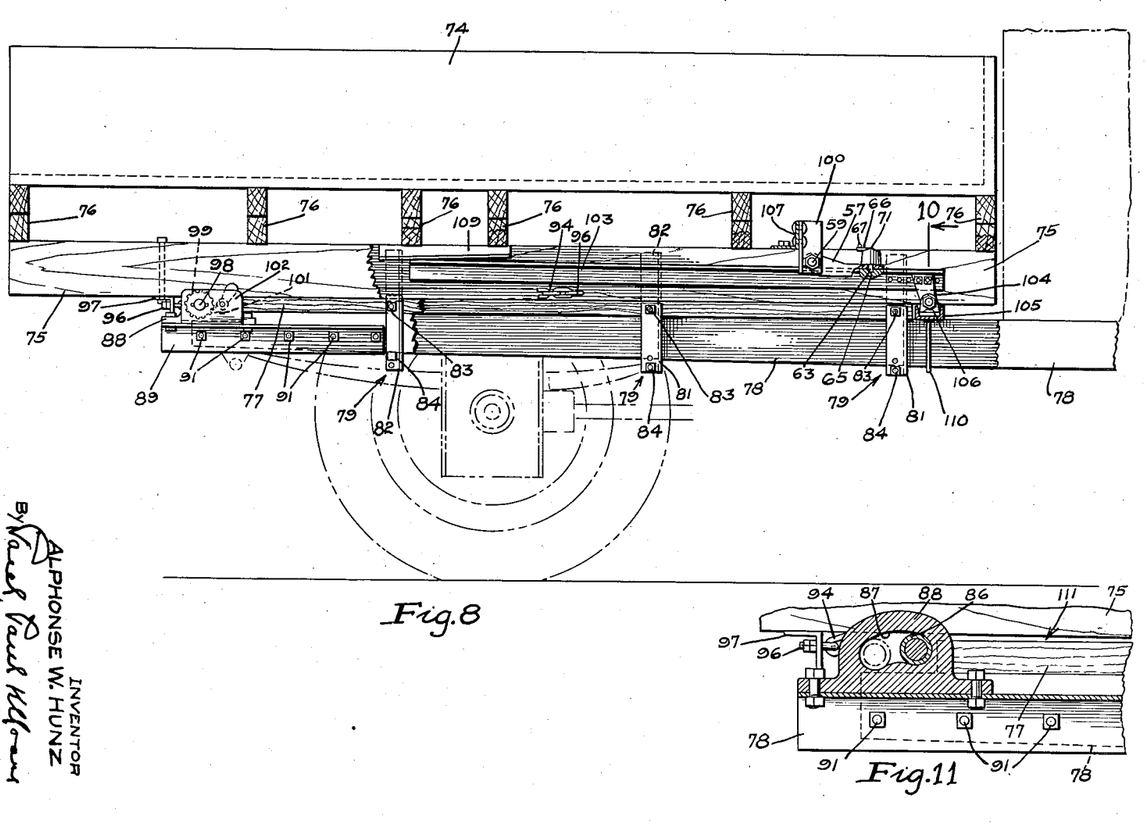
Figure 8 is a detail sectional view showing the rear portion of a truck with the invention embodied in the construction thereof.
Figure 11 is a detail sectional view on the line 11—11 of Figure 9.
Figures 9, 10:
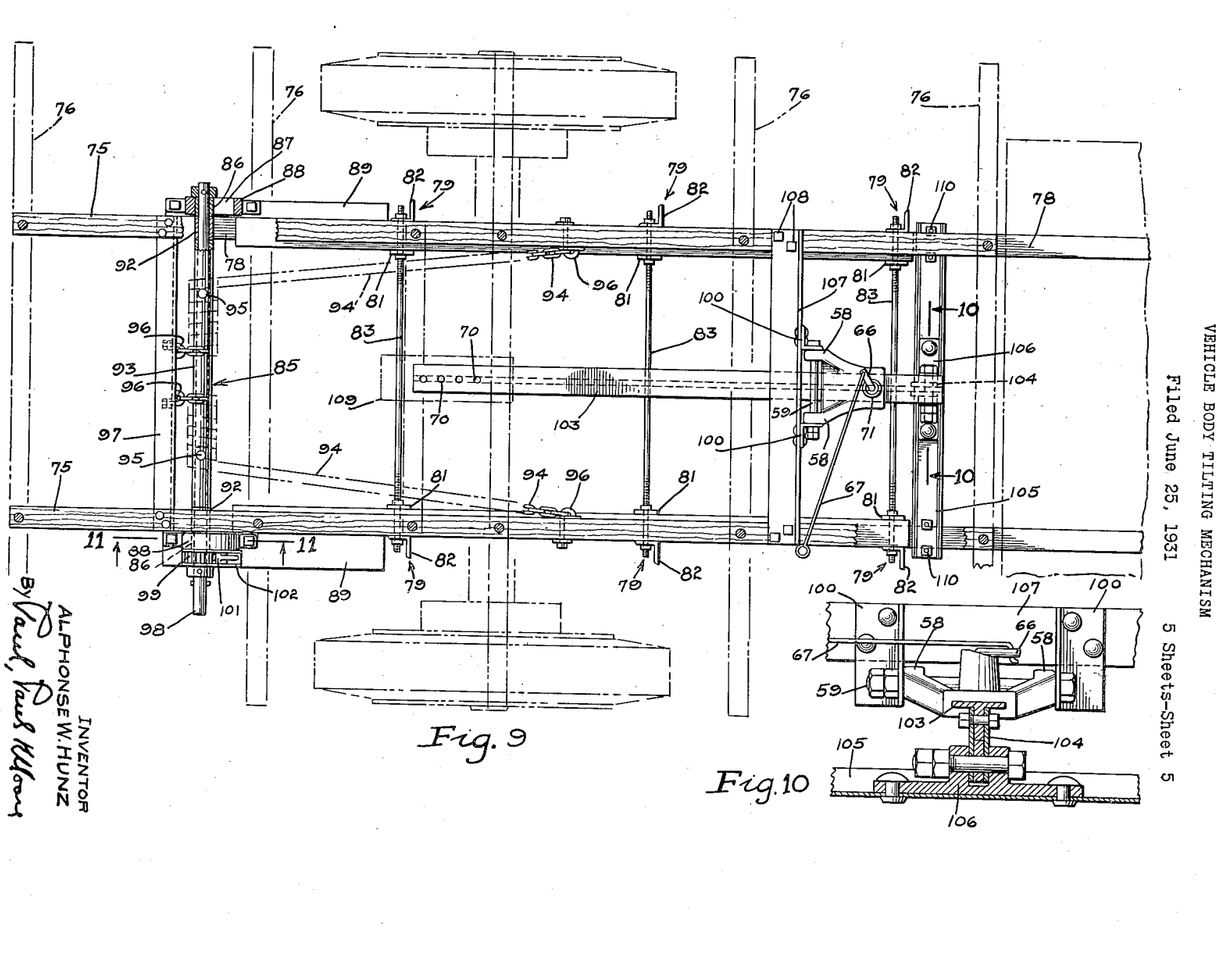
Figure 9 is a plan view of Figure 8.
Figure 10 is a detail sectional view on the line 10—10 of Figure 9.

Figures 8, 9, 10, and 11 illustrate the invention applied to an ordinary automotive truck, comprising a load carrier or box 74 supported upon suitable side beams 75—75, suitable cross members 76 being interposed between the box 74 and beams 75. The side beams 75—75, when the box is in its normal position as shown in Figure 8, are supported directly upon suitable filler blocks 77 which are suitably secured to the top surfaces of the side rails 78 of the truck chassis. These filler blocks are secured to the side rails 78 by suitable upright clamping members 79, each comprising a clamping plate 81 and an angle iron 82 which engage the side rails 78 of the truck and are secured thereto by suitable tie rods 83 and bolts 84. The bolts 83—83 pass through alined apertures provided in the clamping plates 81, and angle irons 82, whereby these parts are securely clamped together. The tie rods 83 are interposed between the filler blocks 77—77 as shown in Figures 8 and 9. It will also be noted, by reference to Figure 8, that the upright angle irons 82 extend above the filler blocks 77 and provide upright posts between which the side beams 75—75 of the box 74 are supported.

The load carrier or box 74 is adapted to be tilted to an inclined position in the manner shown and described with reference to Figures 1 and 2. The means for thus tilting the box consists of a shaft 85 having anti-friction rollers 86—86 provided adajacent the ends thereof which are supported in arcuately formed slots or apertures 87 provided in the brackets 88 mounted upon suitable supporting members 89, secured to the side beams 78—78 of the truck chassis by such means as bolts 91. The rollers 86 are adapted to roll upon the bottom curved surfaces of the slots 87, in a manner similar to that shown and described with reference to Figure 7A. Similar anti-friction rollers 92 are provided upon the shaft 85 adjacent to the rollers 86, upon which the rear portion of the box 74 is supported during the dumping operation of the box. The lower faces of the side rails 75—75 of the box engage the rollers 92, as will be clearly understood by reference to Figures 9 and 11.

The shaft 85 is constructed in a manner similar to the shaft 17, and has flexible elements or chains 94—94 coiled thereabout, as indicated in Figure 9. The intermediate portion of each chain 94 is secured to the shaft 85 by suitable pins 95 passing through a link of each chain and through the shaft 85. The forwardly extending ends of the chains 94—94 are secured to the side rails 75—75 by suitable hook bolts 96—96, and the rear portions of the chains are secured to a cross member 97 by similar hook bolts 96. The cross member 97 is secured to the bottom faces of the side rails 75—75 of the load carrier or box 74.

The shaft 85 has an extension 98 adapted to receive an operating member such as the sleeve 27 and rod 31, as shown in Figure 3, whereby the shaft may be rotated to longitudinally translate the box 74 upon the side beams 78 of the truck chassis. A ratchet wheel 99 is secured to the shaft 85 and has a pawl 101 engageable therewith whereby the shaft may be locked against rotation in one direction during the load dumping operation. The pawl 101 is mounted in a U-shaped support 102 preferably formed of sheet metal and having the side walls thereof spaced apart to receive the ratchet wheel 99 and the pawl 101. The supporting member 102 is apertured to receive the shaft extension 98 as best shown in Figure 8.

The mechanism provided at the forward end of the load carrier or box 74 to cause it to be tilted to an inclined load dumping position when the box is moved forwardly, after having been moved rearwardly by manipulation of the shaft 85, is quite similar to the corresponding mechanism illustrated in Figures 1 and 2, and comprises a strut 103 having a bracket 104 adjustably secured to the forward end portion thereof. The bracket 104 is pivotally connected to bracket 106 mounted upon a cross member 105 secured to the side beams 78—78 of the truck chassis by suitable clamps 110. A guide 57, similar to the one shown in Figures 1 and 2, is slidably engaged with the strut 103 and has its rear portion pivotally supported between upright angle brackets 100, mounted upon a cross member 107 suitably secured to the upper faces of the side rails 75—75 of the truck body or box 74 by suitable bolts 108. When the box is in its normal load supporting position, as shown in Figure 8, the strut 103 will be disposed beneath the cross members 76 of the truck body. A suitable guide member 109 is secured to the lower edges of the intermediate cross member 76 of the truck body adapted to be engaged by the rear end of the strut 103, as shown in Figure 8. Suitable apertures 70 are provided at the rear end of the strut 103 adapted to receive the locking bolt 63, when the truck body is tilted to an inclined position. (See Figure 9.)

When it is desired to tilt the box or body 74 to an inclined load dumping position, the shaft 85 is rotated in a counter clock-wise direction, when viewed as shown in Figures 8 and 11, whereby the forwardly extending chain sections will be put under tension, causing the shaft to move forwardly in the curved slots 87, as shown in Figure 11. Such movement of the shaft 85 will cause the side rails 75—75 of the truck body to move out of engagement with the upper faces of the filler blocks 77, as indicated at 111 in Figure 11. Continued rotation of the shaft 85 in a counter clockwise direction, after it assumes the full line position shown in Figure 11, will cause the box 74 to be translated in a rearward direction upon the side beams 78 of the truck chassis. During such movement of the box 74, the guide 57 will slide along on the strut 103, it being understood that the locking pin or bolt 63 has previously been moved out of engagement with the socket 65 provided at the forward end of the strut 103, and with which it was engaged.

When the box has been moved to a rearward position, the locking bolt 63 automatically drops into one of the sockets 70 provided at the rear end of the strut 103, because of the action of the spring 64. The direction of rotation of the shaft 85 is then reversed, whereupon the box will be moved forwardly with respect to the side rails 78—78 of the truck chassis. Because of the locking bolt 63 being lockingly engaged with the rear end portion of the strut 103, the forward end portion of the truck body is resisted from forward movement in a manner similar to that shown and described with reference to Figure 2, whereby it will be elevated as the shaft is rotated, until it assumes an inclined load dumping position similar to the position of the box 8, shown in Figure 2. The box 74 is returned to its normal load receiving position in a manner similar to that shown and described with reference to Figures 1 and 2.

It will thus be seen that because of the arcuately formed slots 87 of the brackets 88, as soon as the load dumping operation is commenced, the rear intermediate portions of the side rails 75—75 of the truck body 74 will be lifted out of frictional engagement with the filler blocks 77—77. When the box has been emptied of its contents and is being returned to its normal load supporting position, the shaft will assume the position indicated in dotted lines in Figure 11, whereupon the side rails 75—75 of the truck body will be supported directly upon the filler blocks 77—77.

The body tilting mechanism herein disclosed has been found very practical in actual use. Its novel construction is such that it may readily be applied to an ordinary wagon, truck or sled, at a small cost, whereby the body of such a vehicle may be tilted to facilitate loading and unloading.

I claim as my invention:

1. A vehicle comprising spaced-apart supports, a load carrier mounted on said supports, means for imparting first a backward and then a forward movement to the carrier upon said supports, a member having one end pivotally connected with the forward portion of the vehicle, and having its opposite end slidably connected with the carrier, and means for locking said member against sliding movement with the carrier, when the latter has been moved rearwardly, whereby when the carrier is moved forwardly with respect to said supports, said member will cause the carrier to be tilted to an inclined load-dumping position.

2. A vehicle comprising front and rear supports, a carrier mounted for longitudinal movement on said supports, means at one of said supports for longitudinally translating said carrier upon said supports, and a strut connected with the opposite end portion of the vehicle and having a sliding connection with the carrier, and means operable adjustably to lock said strut against sliding movement with the carrier, when the latter has been moved rearwardly to an inclined position.

3. A vehicle comprising front and rear supports, a carrier mounted on said supports and adapted for longitudinal movement thereon, a winding mechanism on the rear support having a connection with said carrier whereby the latter may be longitudinally moved on said supports, a strut having one end secured to the front portion of the vehicle and having a sliding connection with the carrier, and means for securing the carrier to the strut, when the carrier has been moved rearwardly to an inclined load-receiving position.

4. A vehicle comprising front and rear supports, a carrier mounted for longitudinal movement on said supports, means on the rear support for longitudinally translating said carrier upon said supports, a strut connected with the opposite end portion of the vehicle and having a movable connection with the carrier, means for locking said strut against sliding movement, whereby when the carrier is moved in one direction, said strut will tilt the carrier to an inclined load-dumping position, and means for elevating the rear portion of the carrier upon initial longitudinal movement thereof.

5. A vehicle comprising front and rear supports, a carrier mounted upon said supports and adapted for longitudinal movement thereon, a winding mechanism on the rear support for longitudinally translating the carrier, a slide pivotally connected with the forward portion of the carrier, a strut having one end pivotally connected with the front portion of the vehicle and slidably received in said slide, and a locking bolt on the slide for locking the strut thereto, whereby when the carrier is moved in one direction upon the rear support, said strut will cause the carrier to be tilted to an inclined load-dumping position.

6. A vehicle comprising front and rear supports, a carrier mounted upon said supports and adapted for longitudinal movement thereon, a winding mechanism on the rear support for longitudinally translating the carrier, a slide pivotally connected with the forward portion of the carried, a strut having one end pivotally connected with the front portion of the vehicle and slidably received in said slide, a spring-actuated locking bolt on the slide for locking the strut thereto, whereby when the carrier is moved in one direction upon the rear support, said strut will cause the carrier to be tilted to an inclined load-dumping position, and a cam for actuating said locking bolt when the latter is rotated.

7. A vehicle comprising a rear bolster and a front bolster, anti-friction rollers mounted upon the rear bolster, a frame movable upon said rollers, a load carrier supported upon said frame and said front bolster, means for relatively moving said frame upon said rollers to move the carrier in a rearward direction, a member having one end pivotally supported adjacent to said front bolster and having a slidable connection with the forward portion of the carrier, and means operable adjustably to secure the carrier to said member when the carrier has been moved rearwardly to an inclined load-receiving position.

8. A vehicle comprising front and rear supports, a frame movably supported on the rear support, a mechanism for translating said frame rearwardly and forwardly on said support, a load carrier supported on said frame and said front support, a strut pivotally mounted upon the vehicle adjacent to said front support and extending rearwardly beneath the carrier, a slide on the bottom of the carrier for slidably supporting the rearwardly extending portion of said strut, and means for locking the strut to said slide when the carrier has been moved rearwardly by actuation of said mechanism, whereby when said frame is moved forwardly, said strut will tilt the carrier and frame to an inclined load-dumping position.

9. A vehicle comprising front and rear supports, a frame mounted on said rear support, a winding mechanism for moving said frame rearwardly and forwardly on said support, a load carrier supported upon said frame, and said front support, and means at the forward portion of the vehicle operatively connected with said carrier and permitting rearward movement thereof, but adapted to resist forward movement thereof, whereby when said frame and carrier have been moved rearwardly by the actuation of said winding mechanism, and said mechanism is operated to move the frame and carrier forwardly, said means will cause the carrier and frame to be tilted to a load-dumping position.

10. A vehicle comprising a front bolster and a rear bolster, a shaft rotatably mounted upon the rear bolster and having anti-friction rollers mounted thereon, a frame movably supported upon said rollers, and having flexible means connecting it with said shaft whereby when the latter is rotated, said frame may be moved backwardly and forwardly with respect to the rear bolster, a load carrier such as a wagon box supported on said frame and the front bolster, a strut having one end pivotally connected with the front bolster, a slide pivotally connected with the forward portion of the carrier and having a sliding connection with said strut, and means operable adjustably to lock said slide to said strut when the carrier has been moved rearwardly to an inclined load-receiving position.

11. In combination with a vehicle comprising front and rear axle assemblies, each provided with a bolster and connected together by a reach rod, of a load carrier movably mounted on said bolsters, means at the rear bolster for moving the carrier backwardly and forwardly on said bolsters, a strut pivotally mounted upon the reach rod adjacent to the front bolster and extending rearwardly beneath the carrier, a slide connecting the strut with the bottom of the carrier, and means for locking said strut to said slide, when the carrier has been moved backwardly upon said bolster, whereby when the carrier is moved forwardly thereon, said strut will tilt the carrier to an inclined load-dumping position.

12. In combination with a vehicle comprising front and rear axle assemblies, each provided with a bolster and connected together by a reach rod, of a load carrier movably mounted on said bolsters, means at the rear bolster for moving the carrier backwardly and forwardly on said bolsters, a strut pivotally mounted upon the reach rod adjacent to the front bolster and extending rearwardly beneath the carrier and having a sliding connection therewith, means for locking said strut against sliding movement on the carrier whereby when the latter has been moved backwardly upon said bolster, and the carrier is moved forwardly thereon, said strut will tilt the carrier to an inclined load-dumping position, and means for preventing relative rotation of the front bolster when the carrier is moved out of engagement therewith.

13. A vehicle comprising a front bolster and a rear bolster, a shaft rotatably mounted upon the rear bolster and having anti-friction rollers mounted thereon, a frame movably supported upon said rollers and having flexible means connecting it with said shaft, whereby when the latter is rotated, said frame may be moved backwardly and forwardly with respect to the rear bolster, means on the rear bolster adapted to support said frame independently of said rollers when the frame is in normal load-supporting position, a load carrier supported on said frame and said front bolster, a strut having one end pivotally connected with the forward portion of the vehicle and extending rearwardly under the carrier means slidably connecting the strut with the forward portion of the carrier, means for locking the strut against sliding movement with respect to the carrier, when the latter has been moved to a rearward position, whereby when the carrier is moved forwardly upon the rear bolster, said strut will tilt the carrier to an inclined load-dumping position.

14. A vehicle comprising a front bolster and a rear bolster, a shaft rotatably mounted upon the rear bolster and having anti-friction rollers mounted thereon, a frame movably supported upon said rollers and having flexible means connecting it with said shaft, whereby when the latter is rotated, said frame may be moved backwardly and forwardly with respect to the rear bolster, abutments on the rear bolster adapted to support said frame independently of said rollers when the frame is in normal load-supporting position, a load carrier such as a wagon box supported on said frame and said front bolster, a strut having one end pivotally connected with the forward portion of the vehicle and extending rearwardly under the carrier, means slidably connecting the strut with the forward portion of the carrier, means for locking the strut against sliding movement with respect to the carrier, when the latter has been moved to a rearward position, whereby when the carrier is moved forwardly upon the rear bolster, said strut will tilt the carrier to an inclined load-dumping position, and a cam device adapted to elevate said shaft upon initial movement thereof to move said frame rearwardly, whereby said frame will be moved out of engagement with said abutments and will be supported directly upon the rollers on said shaft.

15. A vehicle comprising front and rear bolsters, a shaft, brackets mounted on the rear bolster and each having an arcuately formed slot wherein said shaft is supported and whereby the shaft is adapted for lateral movement, the bottoms of said slots providing cam faces adapted to elevate the shaft when moved laterally in one direction, rollers on said shaft, a frame adapted to be supported upon said rollers and having means connecting it with said shaft whereby, when the shaft is rotated, said frame may be moved rearwardly and forwardly upon the rear bolster, a load carrier supported on said frame and adapted for movement therewith, abutments on the rear bolster adapted to support the frame and carrier independently of said rollers, when said frame and carrier are in load-carrying position, and means for rotating said shaft, initial rotation of the shaft to move the frame in a rearward direction, causing said shaft to move laterally in a forward direction in said arcuately formed slots, whereby it will be elevated and thereby remove the load from said abutments and transfer it onto the rollers on said shaft.

16. A vehicle comprising front and rear bolsters, a shaft, brackets mounted on the rear bolster and each having an arcuately formed slot wherein said shaft is supported and whereby the shaft is adapted for lateral movement, the bottoms of said slots providing cam faces adapted to elevate the shaft when moved laterally in one direction, rollers on said shaft, a frame adapted to be supported upon said rollers and having means connecting it with said shaft whereby, when the shaft is rotated, said frame may be moved rearwardly and forwardly upon the rear bolster, a load carrier supported on said frame and adapted for movement therewith, abutments on the rear bolster adapted to support the frame and carrier independently of said rollers, when said frame and carrier are in load-carrying position, means for rotating said shaft, initial rotation of the shaft to move the frame in a rearward direction, causing said shaft to move laterally in a forward direction in said arcuately formed slots, whereby it will be elevated and thereby remove the load from said abutments and transfer it onto the rollers on said shaft, and means at the forward portion of the vehicle adapted to tilt and hold the carrier in an inclined load-dumping position, when the frame and carriers are moved forwardly with respect to the rear bolster.

17. A vehicle comprising spaced-apart load-carrier supports, a load carrier mounted on said supports, a member having one end pivotally connected with the vehicle adjacent one of said supports and having its opposite end slidably connected with the carrier, means for translating the carrier longitudinally on said supporting means, and means independent of said translating means adapted to tilt the carrier to an inclined position, upon movement of the carrier in one direction on said supports.

18. A vehicle comprising load-carrier supporting means, a load carrier mounted on said supporting means, means pivotally connected with the vehicle adjacent the forward portion of said supporting means, and having a movable connection with the carrier, means for translating the carrier rearwardly and forwardly on said supporting means, means independent of said translating means for causing said carrier to tilt to an inclined position when moved forwardly on said supports, and means for limiting the rearward swing of the carrier.

19. A vehicle comprising load-carrier supporting means, a load carrier mounted on said supporting means, a member having one end pivotally connected with the vehicle and havng its opposite end slidably connected with the carrier, means for moving the carrier longitudinally on the vehicle, means causing said carrier to tilt upon continued rearward movement thereof, and means for locking the carrier against movement on the pivotal member when the carrier is in an inclined load-receiving position.

20. A vehicle comprising load-carrier supporting means, a load carrier movably mounted on said supporting means, means for imparting a reciprocal movement to the carrier on said supporting means, a member having one end pivotally connected with the vehicle adjacent the forward portion of said supporting means and having its opposite end slidably connected with the carrier, and means for locking said member against sliding movement with the carrier, when the latter has been moved rearwardly, whereby when the carrier is moved forwardly with respect to said supporting means, said member will cause the carrier to be tilted to an inclined load-dumping position.

21. In combination with a vehicle comprising suitable supports adapted to support a load carrier, means at one of said supports having a connection with the carrier and by which said carrier may be relatively moved upon its supports, means having a pivotal connection with the vehicle adjacent to the other support and having a movable connection with the carrier whereby the latter may be moved relatively thereto, and means for securing the carrier to said pivoted means whereby when the carrier is relatively moved in one direction, it will be tilted to an inclined load-dumping position.

22. A vehicle comprising spaced apart supports, a load carrier movably mounted on said supports, means connected with one of said supports for longitudinally translating said carrier on said supports, a member having one end pivotally supported upon the vehicle adjacent another of said supports, selectively operable means movably connecting the opposite end portion of said member to the carrier, whereby upon selective operation of said selective means, and said translating means is actuated, the carrier may be tilted and held in an inclined position, when moved in one direction.

23. A vehicle comprising load carrier supporting means, a load carrier movably mounted on said supporting means, translating means connected adjacent one end of said supporting means for imparting first a backward and then a forward movement to the carrier, and means pivotally connected adjacent the opposite end of said supporting means and having a selectively movable connection with the carrier, whereby upon selective operation of said selectively movable connection, and said translating means is actuated, the carrier will be tilted to an inclined position when moved in one direction.

24. A vehicle comprising load carrier supporting means, a load carrier movably mounted on said supporting means, means connected adjacent one end of said supporting means for imparting first a backward and then a forward movement to the carrier, a device pivotally connected adjacent the opposite end of said supporting means and having a slidable and adjustable connection with the carrier, and means for selectively operatively connecting said device with the carrier, whereby upon continued forward movement of the carrier by said translating means, said carrier is tilted to a more elevated load dumping position.

ALPHONSE W. HUNZ.